(12) United States Patent
Jung et al.

(10) Patent No.: US 10,762,709 B2
(45) Date of Patent: Sep. 1, 2020

(54) DEVICE AND METHOD FOR PROVIDING AUGMENTED REALITY FOR USER STYLING

(71) Applicant: KYUNGPOOK NATIONAL UNIVERSITY INDUSTRY-ACADEMIC COOPERATION FOUNDATION, Daegu (KR)

(72) Inventors: Soon Ki Jung, Daegu (KR); Hak-Rin Kim, Daegu (KR); Gi-Sook Jung, Daegu (KR); Jae Seok Jang, Daegu (KR); Min-Kyu Park, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 29 days.

(21) Appl. No.: 15/774,767

(22) PCT Filed: Oct. 5, 2016

(86) PCT No.: PCT/KR2016/011147
§ 371 (c)(1),
(2) Date: May 9, 2018

(87) PCT Pub. No.: WO2017/082539
PCT Pub. Date: May 18, 2017

(65) Prior Publication Data
US 2018/0330545 A1    Nov. 15, 2018

(30) Foreign Application Priority Data
Nov. 9, 2015  (KR) .......................... 10-2015-0156592

(51) Int. Cl.
*G06T 19/00*     (2011.01)
*G06K 9/00*      (2006.01)
(Continued)

(52) U.S. Cl.
CPC .......... *G06T 19/006* (2013.01); *G02B 27/017* (2013.01); *G06F 3/01* (2013.01);
(Continued)

(58) Field of Classification Search
CPC ...... G02B 2027/0138; G02B 2027/014; G02B 2027/0178; G02B 2027/0187;
(Continued)

(56) References Cited

U.S. PATENT DOCUMENTS 6,553,281 B1 *  4/2003  Liu ........................ A61B 3/113
                                                         351/210
9,858,719 B2    1/2018  Dorner et al.
(Continued)

FOREIGN PATENT DOCUMENTS

JP    2006-018476 A    1/2006
KR    10-2011-0002610 A    1/2011
(Continued)

OTHER PUBLICATIONS

International Search Report and Written Opinion for related PCT Application No. PCT/KR2016/011147, dated Jan. 19, 2017. English translation provided for ISR. 16 pages.
(Continued)

*Primary Examiner* — Sultana M Zalalee
(74) *Attorney, Agent, or Firm* — Procopio, Cory, Hargreaves & Savitch LLP

(57) ABSTRACT

Provided is a an augmented reality providing device including: a sensing unit configured to sense a body part of a user; a display unit configured to display an image; a semi-transparent mirror unit disposed spaced from the display unit
(Continued)

and configured to reflect light incident from the user to emit the reflected light to the user, and transmit light incident from the display unit to provide the transmitted light to the user; and a control unit configured to determine a position at which the image is displayed on the display unit based on the sensed body part.

10 Claims, 11 Drawing Sheets

(51) Int. Cl.
*G06F 3/01* (2006.01)
*G02B 27/01* (2006.01)
(52) U.S. Cl.
CPC ....... *G06K 9/0061* (2013.01); *G06K 9/00597* (2013.01); *G06K 9/00671* (2013.01); *G02B 2027/014* (2013.01); *G02B 2027/0138* (2013.01); *G02B 2027/0178* (2013.01); *G02B 2027/0187* (2013.01)
(58) Field of Classification Search
CPC .... G02B 27/017; G06F 3/01; G06K 9/00597; G06K 9/0061; G06K 9/00671; G06T 19/006
See application file for complete search history.

(56) References Cited

U.S. PATENT DOCUMENTS

| | | | | |
|---|---|---|---|---|
| 2005/0036109 A1* | 2/2005 | Blum | ................... | G02B 26/06 351/159.03 |
| 2005/0251800 A1 | 11/2005 | Kurlander et al. | | |
| 2010/0201621 A1* | 8/2010 | Niikawa | ................ | G06F 3/013 345/158 |
| 2011/0234581 A1* | 9/2011 | Eikelis | ............... | G06K 9/00228 345/419 |
| 2011/0267374 A1* | 11/2011 | Sakata | ................... | G06F 3/013 345/672 |
| 2013/0136304 A1* | 5/2013 | Anabuki | ........... | G06K 9/00362 382/103 |
| 2013/0215149 A1* | 8/2013 | Hayashi | ................. | G06T 19/00 345/633 |
| 2013/0329957 A1* | 12/2013 | Ebisawa | ................ | A61B 3/113 382/103 |
| 2013/0342536 A1* | 12/2013 | Taya | ....................... | G06F 3/012 345/427 |
| 2014/0092139 A1* | 4/2014 | Sullivan | ............... | G06K 9/0061 345/649 |
| 2014/0354947 A1 | 12/2014 | Hsieh et al. | | |
| 2015/0038225 A1* | 2/2015 | Lee | ......................... | G06Q 50/10 463/31 |
| 2015/0304625 A1* | 10/2015 | Seto | ...................... | H04N 13/122 348/44 |
| 2015/0331576 A1* | 11/2015 | Piya | ........................ | G06F 3/011 715/850 |
| 2016/0048211 A1* | 2/2016 | Raffle | ..................... | G06F 3/017 715/863 |
| 2016/0089980 A1* | 3/2016 | Kurahashi | ............... | G06F 3/013 345/156 |
| 2016/0187666 A1* | 6/2016 | Manns | ............... | G02B 27/2278 359/479 |
| 2016/0292917 A1* | 10/2016 | Dorner | ............... | G03B 21/2053 |
| 2016/0343166 A1* | 11/2016 | Inoko | .................... | G06T 19/006 |
| 2017/0154470 A1* | 6/2017 | Zhang | ................ | G06K 9/00261 |
| 2017/0188020 A1* | 6/2017 | Sakai | ........................ | G02F 1/13 |

FOREIGN PATENT DOCUMENTS

| | | |
|---|---|---|
| KR | 10-2013-0104190 A | 9/2013 |
| KR | 10-1359660 B | 2/2014 |
| KR | 10-2014-0042119 A | 4/2014 |
| KR | 10-2015-0013810 A | 2/2015 |
| WO | 2013/173514 A2 | 11/2013 |

OTHER PUBLICATIONS

Jang, Jae Seok et al. "Depth-of-Field Analysis for Focused Augmented Mirror", CGI2015, the 32nd Annual Conference, Jun. 24, 2015, pp. 1-58.

Jang, Jae Seok et al. "Depth-of-Field Analysis for Focused Augmented Mirror", CGI2015 Powerpoint, the 32nd Annual Conference, Jun. 24, 2015, pp. 1-36.

International Preliminary Report on Patentability for related International Application No. PCT/KR2016/011147, dated May 15, 2018; English translation provided; 25 pages.

* cited by examiner

DEVICE AND METHOD FOR PROVIDING AUGMENTED REALITY FOR USER STYLING

CROSS-REFERENCE TO RELATED APPLICATIONS

This U.S. non-provisional patent application claims priority under 35 U.S.C. § 119 to Korean Patent Application No. 10-2015-0156592, filed on Nov. 9, 2015, in the Korean Intellectual Property Office, the entire contents of which are hereby incorporated by reference, and is a National Stage entry of International Application Number: PCT/KR2016/011147 (International Filing Date: Oct. 5, 2016).

STATEMENT REGARDING PRIOR DISCLOSURES BY THE INVENTORS

The inventors of the present application authored and disclosed the subject matter of the present application as a Conference paper 2015-6-24 (Jun. 24, 2015) and as an oral presentation on 2015-6-25 (Jun. 25, 2015). These prior disclosures have been submitted in an Information Disclosure Statement in the present application as "JANG, JAE SEOK et al. "Depth-of-Field Analysis for Focused Augmented Mirror", CGI2015, the 32nd Annual Conference, 24 Jun. 2015, pages 1-58" and "JANG, JAE SEOK et al. "Depth-of-Field Analysis for Focused Augmented Mirror", CGI2015 Powerpoint, the 32nd Annual Conference, 24 Jun. 2015, pages 1-36.", respectively.

TECHNICAL FIELD

The present disclosure relates to a device and method for providing an augmented reality.

BACKGROUND ART

Augmented reality technology, which combines virtual objects into a single image in the real world, is being implemented in a variety of applications as smart devices become widespread. For example, if a user captures an image around with a camera on user's smartphone, various information such as the location of a nearby shop, a telephone number, and the like are three-dimensionally displayed on the image.

Such augmented reality is implemented through a wearable computer such as a Head Mounted Display (HMD), but a mirror-type augmented reality system may be more suitable for user styling such as a user's appearance, than a wearable computer. However, much research is needed to commercialize a mirror-type augmented reality system, and there are many parts to be improved in usability.

DISCLOSURE OF THE INVENTION

Technical Problem

The present disclosure is to provide a device and method for providing an augmented reality capable of improving convenience and usability of a user of a mirror-type augmented reality system in various augmented reality application fields including user's styling.

Technical Solution

Embodiments of the present invention provide an augmented reality providing device including: a sensing unit configured to sense a body part of a user; a display unit configured to display an image; a semi-transparent mirror unit disposed spaced from the display unit and configured to reflect light incident from the user to emit the reflected light to the user, and transmit light incident from the display unit to provide the transmitted light to the user; and a control unit configured to determine a position at which the image is displayed on the display unit based on the sensed body part.

The semi-transparent mirror unit and the display unit may be spaced apart by a distance equal to or longer than a first distance and equal to or shorter than a second distance, the first distance being shorter than a distance between the user and the semi-transparent mirror unit by a predetermined critical distance, the second distance being longer than the distance between the user and the semi-transparent mirror unit by the critical distance.

The critical distance may be determined in advance based on a pupil size of the user.

The critical distance may increase as the pupil size of the user decreases and decrease as the pupil size increases.

The semi-transparent mirror unit and the display unit may be spaced apart by a distance equal to or longer than the first distance and equal to or shorter than the distance between the user and the semi-transparent mirror unit.

The semi-transparent mirror unit may include a light-transmissive substrate having a wire grid formed on at least one side.

The sensing unit may include a camera for capturing the user and generating an image.

The control unit may sense a face object corresponding to the user's face and an eye object corresponding to the user's eye from the image, calculate a view point coordinate in a predetermined spatial coordinate system based on the eye object, calculate a gaze vector in the spatial coordinate system based on the face object, calculate an intersection point coordinate where a straight line extending in a direction parallel to the gaze vector while passing through the view point coordinate and a plane corresponding to the display unit intersect in the spatial coordinate system, and transform the intersection point coordinate of the spatial coordinate system to a plane coordinate of a plane coordinate system set on a plane of the display unit.

The display unit may display a virtual image for styling of the user.

The virtual image may include an image of an accessory wearable by the user.

The control unit may control the display unit to display an image of the accessory at a position apart a predetermined distance in a predetermined direction from the plane coordinate in the plane coordinate system, the predetermined distance and the predetermined direction being predetermined with respect to the accessory.

The control unit may sense a predetermined marking object from the image, track a movement path of the marking object, and control the display unit to display an image of a predetermined color tone on the display unit in correspondence to the movement path.

In other embodiments of the present invention, a method of providing augmented reality to a user by an augmented reality providing device in which a semi-transparent mirror unit and a display unit are spaced apart includes: sensing the user's body part; determining a position at which an image is displayed on the display unit based on the sensed body part; and displaying the image based on the determined position.

The sensing of the user's body part may include generating an image by capturing the user.

The determining of the position at which the image is displayed on the display unit based on the sensed body part may include: sensing a face object corresponding to the user's face and an eye object corresponding to the user's eye from the image; calculating a view point coordinate in a predetermined spatial coordinate system based on the eye object; calculating a gaze vector in the spatial coordinate system based on the face object; calculating an intersection point coordinate where a straight line extending in a direction parallel to the gaze vector while passing through the view point coordinate and a plane corresponding to the display unit intersect in the spatial coordinate system; and transforming the intersection point coordinate of the spatial coordinate system to a plane coordinate of a plane coordinate system set on a plane of the display unit.

The displaying of the image based on the determined position may include displaying a virtual image for styling of the user.

The virtual image may include an image of an accessory wearable by the user.

The displaying of the image based on the determined position may include displaying an image of the accessory at a position apart a predetermined distance in a predetermined direction from the plane coordinate in the plane coordinate system, the predetermined distance and the predetermined direction being predetermined with respect to the accessory.

The determining of the position at which the image is displayed on the display unit based on the sensed body part may further include: sensing a predetermined marking object from the image; and tracking a movement path of the marking object, wherein the displaying of the virtual image for the styling of the user may include displaying an image of a predetermined color tone on the display unit in correspondence to the movement path.

In still other embodiments of the present invention, a non-transitory computer-readable recording medium stores a program for executing the augmented reality providing method by a computer.

Advantageous Effects

According to an embodiment of the inventive concept, when using a mirrored augmented reality system, a user may see both the actual image of the mirror in the mirror and the virtual image displayed on the display. Thus, the user convenience of the augmented reality system may be increased.

According to an embodiment of the inventive concept, the augmented reality system may be utilized more advantageously because a user may freely try various styles through the augmented reality.

MODE FOR CARRYING OUT THE INVENTION

Other advantages and features of the inventive concept, and implementation methods thereof will be clarified through following embodiments described with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Further, the inventive concept is only defined by scopes of claims.

Although not defined, all the terms used herein (including technical or scientific terms) have the same meaning as those accepted by common techniques in the conventional techniques that this inventive concept belongs. Terms defined by generic dictionaries may be interpreted to have the same meaning as in the related art and/or the text of this application, and even if expressions are not a clearly defined here, they will not be conceptualized or overly formalized in interpretation.

The terms used in this specification are used only for explaining specific embodiments while not limiting the inventive concept. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components. The term 'and/or' as used herein refers to each of the listed configurations or various combinations thereof.

The terms '~unit', '~er', '~block', '~module', etc. used in the entire specification may mean a unit for processing at least one function or operation. For example, it may mean software or a hardware component such as FPGA, or ASIC. However, '~unit', '~er', '~block', '~module', etc. are not meant to be limited to software or hardware. The '~unit', '~er', '~block', '~module', etc. may be configured to be addressable storage media and configured to execute one or more processors.

Thus, for example, the '~unit', '~er', '~block', '~module', etc. include components such as software components, object-oriented software components, class components, and task components, routines, processes, functions, attributes, procedures, subroutines, segments of program code, drivers, firmware, microcode, circuits, data, databases, data structures, tables, arrays, and variables. Functions provided in components and '~units', '~ers', '~blocks', '~modules', etc. may be combined with a smaller number components and '~units', '~ers', '~blocks', '~modules', etc. or may be separated with additional components and '~units', '~ers', '~blocks', '~modules', etc.

Hereinafter, embodiments of the inventive concept will be described in detail with reference to the attached drawings.

Figure 1:
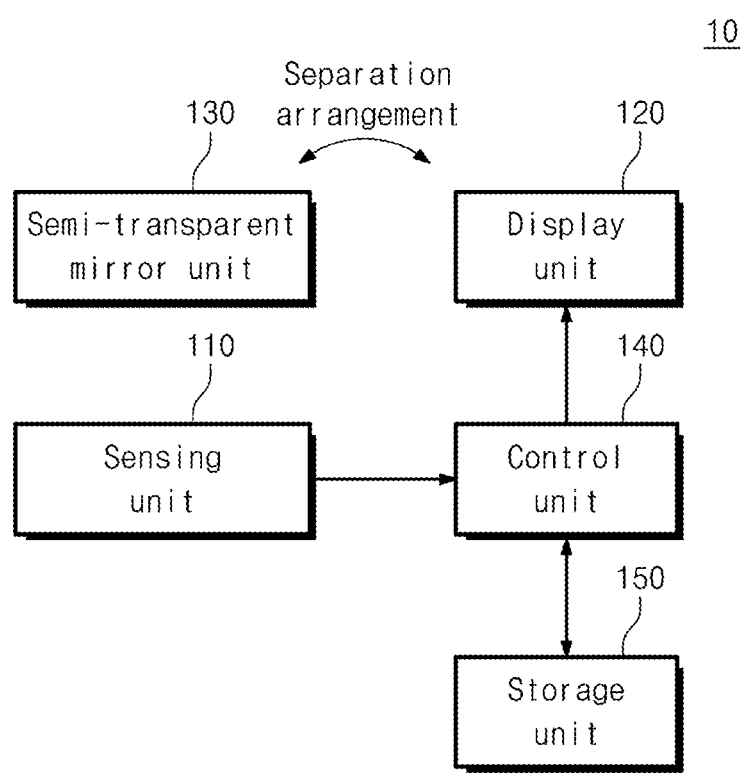
FIG. 1 is an exemplary block diagram of an augmented reality providing device according to an embodiment of the inventive concept.

FIG. 1 is an exemplary block diagram of an augmented reality providing device 10 according to an embodiment of the inventive concept.

As shown in FIG. 1, the augmented reality providing device 10 may include a sensing unit 110, a display unit 120, a semi-transparent mirror unit 130, and a control unit 140.

The sensing unit 110 senses a user's body part. The display unit 120 displays an image. The semi-transparent mirror unit 130 is spaced apart from the display unit 120, reflects light incident from a user and provide the light to the user, transmits light incident from the display unit 120, and provides the light to the user. The control unit 140 determines a position at which the image is displayed on the display unit 120 based on the sensed body part.

Figure 2:
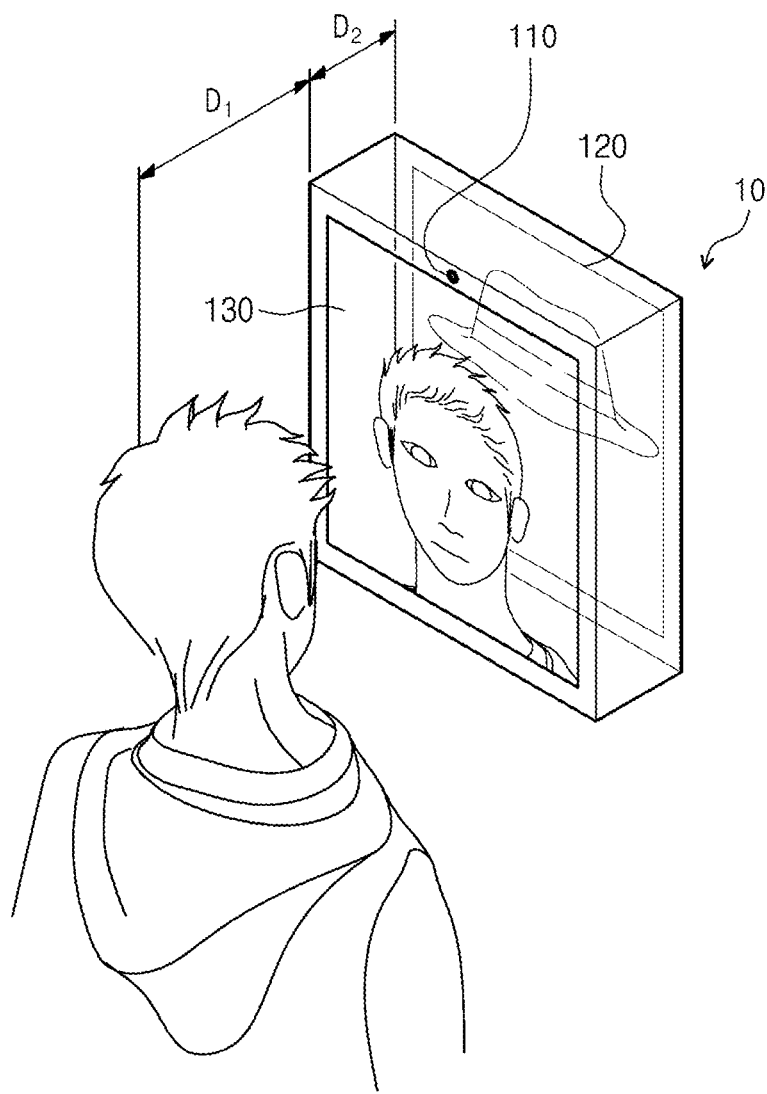
FIG. 2 is a schematic perspective view of an augmented reality providing device according to an embodiment of the inventive concept.

FIG. 2 is a schematic perspective view of an augmented reality providing device 10 according to an embodiment of the inventive concept.

According to an embodiment of the inventive concept, the semi-transparent mirror unit 130 and the display unit 120 are spaced apart by a certain distance.

Referring to FIG. 2, in the augmented reality providing device 10, the semi-transparent mirror unit 130 is provided on one surface of the device, that is, on a surface facing the user, and the display unit 120 may be disposed to face the user with the semi-transparent mirror unit 130 interposed therebetween. That is, the semi-transparent mirror unit 130 is positioned on the front side and the display unit 120 is positioned on the rear side.

Then, the semi-transparent mirror unit 130 and the display unit 120 are spaced apart from each other by a predetermined distance $D_2$. In other words, the display unit 120 is not attached to the rear side of the semi-transparent mirror unit 130 but is spaced apart by a predetermined distance $D_2$.

The sensing unit 110 is a sensing device for sensing a body part of a user, and may be a camera for photographing a user and generating an image according to an embodiment of the inventive concept. Further, the sensing unit 110 may capture motion at predetermined time intervals to track the motion of the user.

In FIG. 2, the sensing unit 110 is mounted toward the front of the augmented reality providing device 10 from above the semi-transparent mirror unit 130 to sense a user's body part, but the mounting position of the sensing unit 110 is not limited thereto.

The display unit 120 is a display panel, and may display an image on a screen. The display unit 120 may use various types of panels such as an LCD and a PDP for displaying a predetermined image on a screen.

The semi-transparent mirror unit 130 reflects incident light on one surface while transmitting light incident on the other surface. In the augmented reality providing device 10 of FIG. 2, the semi-transparent mirror unit 130 reflects incident light from the user and reflects the light to the user, and transmits the light from the display unit 120 to the user.

The image reflected by the semi-transparent mirror unit 130 and provided to the user corresponds to the actual environment of the augmented reality implemented by the embodiment of the inventive concept, and the image generated in the display unit 120 and transmitted to the user through the semi-transparent mirror unit 130 corresponds to a virtual environment of the augmented reality.

Figure 3:
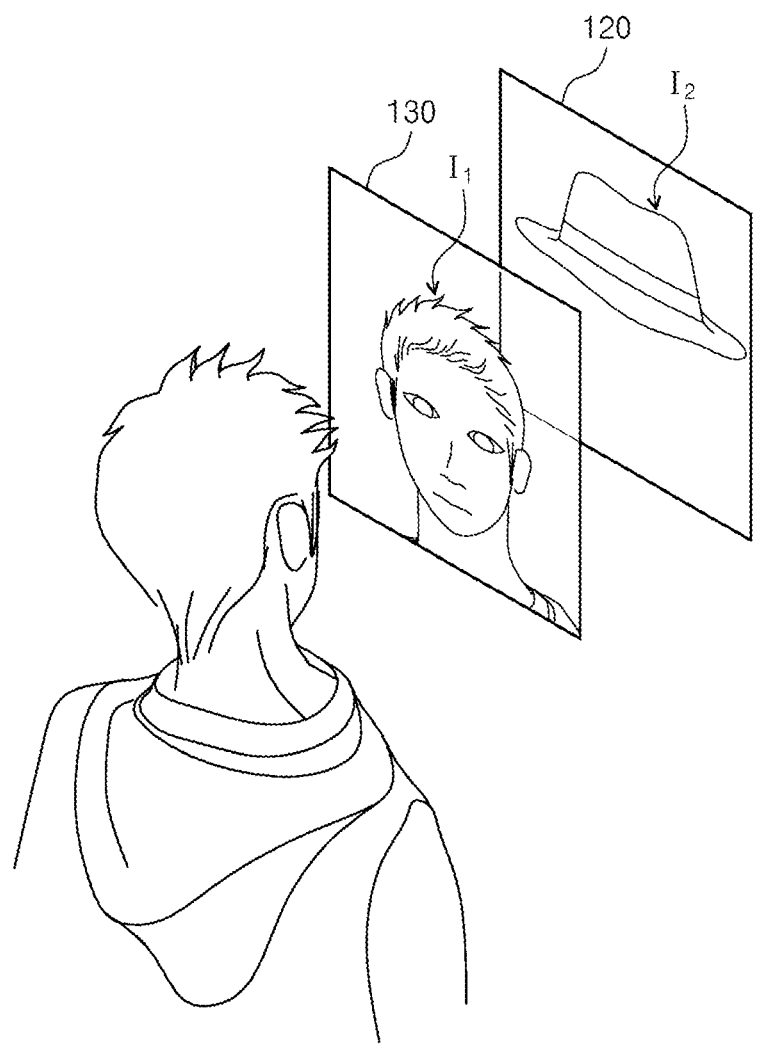
FIG. 3 is an exemplary view for explaining a principle of providing an augmented reality to a user according to an embodiment of the inventive concept.

FIG. 3 is an exemplary view showing a principle that an augmented reality providing device 10 according to an embodiment of the inventive concept provides augmented reality to a user.

As shown in FIG. 3, the user simultaneously views the reflected image $I_1$, for example, the user himself or herself, through the semi-transparent mirror unit 130 and checks the image $I_2$ displayed on the display unit 120 through the semi-transparent mirror unit 130, thereby receiving augmented reality.

Thus, the inventive concept embodiment may realize a mirror-type augmented reality system using semi-transparent mirrors.

Figure 4:
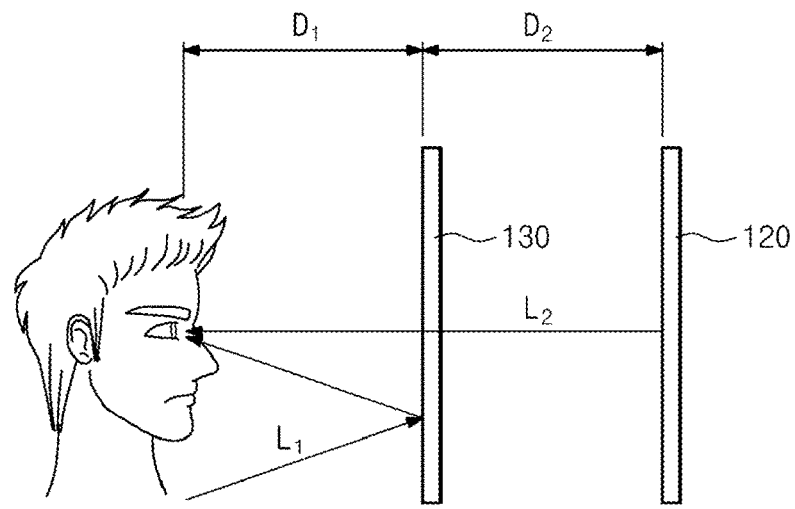
FIG. 4 is an exemplary view showing an operation of an augmented reality providing device according to an embodiment of the inventive concept.

FIG. 4 is an exemplary view showing the operation of an augmented reality providing device 10 according to an embodiment of the inventive concept.

As shown in FIG. 4, the user may face the display unit 120 with the semi-transparent mirror unit 130 interposed therebetween, and the semi-transparent mirror unit 130 and the display unit 120 may be spaced apart from each other.

Since the front side of the semi-transparent mirror unit 130 has the property of a mirror that reflects light, it reflects the light $L_1$ incident from a user on a mirror surface and returns it to the user. Since the rear side of the semi-transparent mirror unit 130 has a property of transmitting light, it transmits the light $L_2$ incident from the display unit 120 to the user. Accordingly, the user may check the composite view of the user's appearance corresponding to the actual environment and an image corresponding to the virtual environment through the combination of the semi-transparent mirror unit 130 and the display unit 120.

According to an embodiment of the inventive concept, the semi-transparent mirror unit 130 may include a light-transmissive substrate having a wire grid formed on at least one surface.

Figure 5:
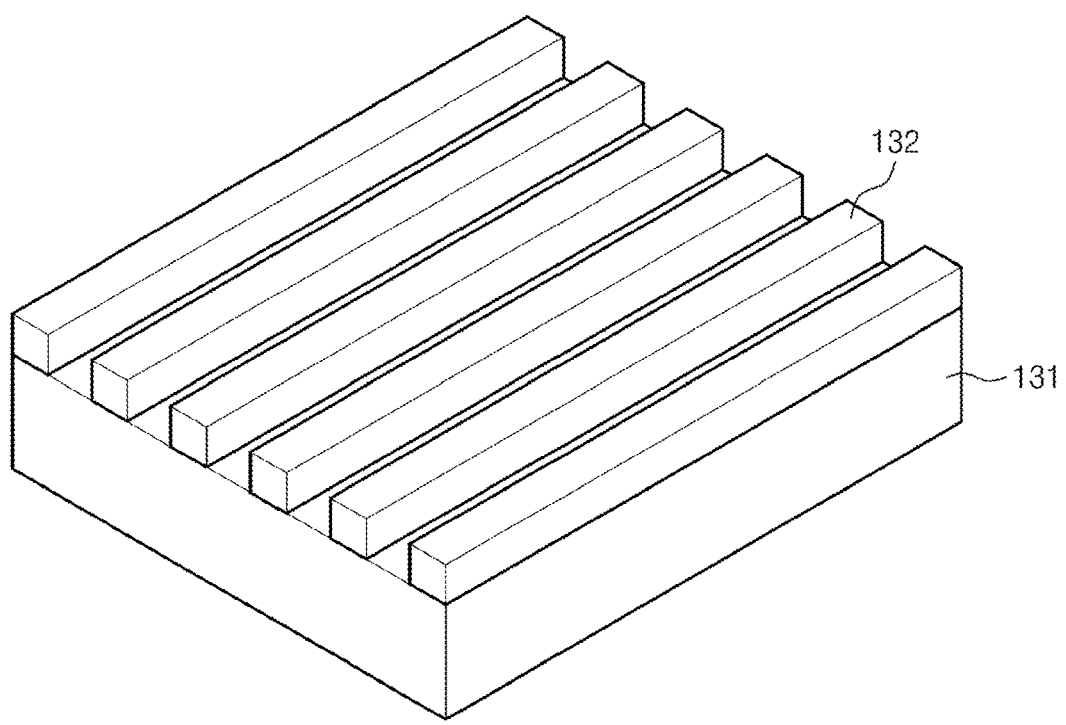
FIG. 5 is a perspective view showing a structure of a semi-transparent mirror unit according to an embodiment of the inventive concept.

FIG. 5 is a perspective view showing an exemplary structure of a semi-transparent mirror unit 130 according to an embodiment of the inventive concept.

As shown in FIG. 5, the semi-transparent mirror unit 130 may realize both the reflective property and the transmission property described above by using the polarization characteristic of the wire grid.

For example, as the wire grid 132 is formed on one surface of the substrate 131 having the property of transmitting light like glass, the semi-transparent mirror unit 130 may transmit light incident on the surface where the wire grid 132 is formed and reflect light incident on the opposite surface.

However, the structure shown in FIG. 5 is only an embodiment of the semi-transparent mirror unit 130, and the structure of the semi-transparent mirror unit 130 is not limited as long as the semi-transparent mirror unit 130 has the above-described reflective property and transmitting property. For example, in relation to the semi-transparent mirror unit 130, optical devices with various structures, for example, a material capable of reflecting light is formed to have a constant thickness instead of that the wire grid 132 is formed on the substrate 131, may be used as the semi-transparent mirror unit 130 of the augmented reality providing device 10.

According to an embodiment of the inventive concept, the semi-transparent mirror unit 130 and the display unit 120 may be spaced apart from each other by a distance equal to or longer than a first distance and equal to or shorter than a second distance. The first distance is shorter than the distance between the user and the semi-transparent mirror unit 130 by a predetermined critical distance. The second distance is longer than the distance between the user and the semi-transparent mirror unit 130 by the predetermined critical distance.

Figure 6:
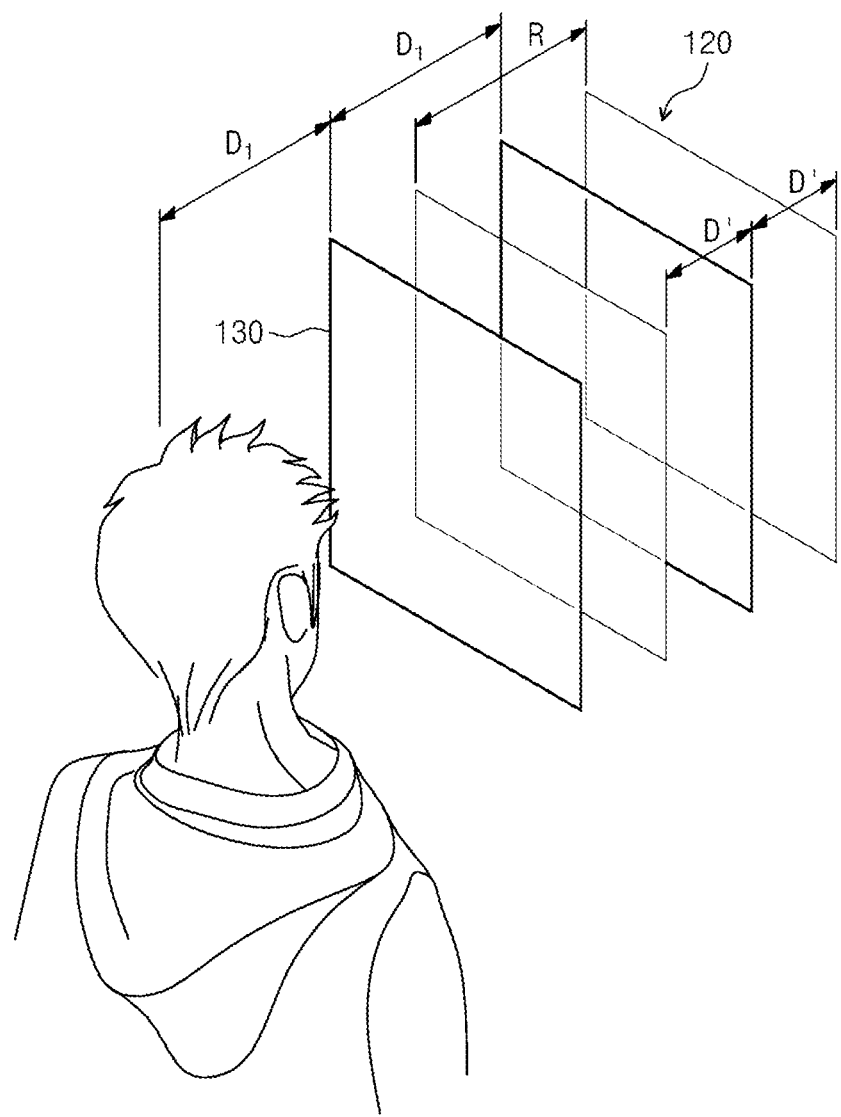
FIG. 6 is an exemplary view for explaining the arrangement relationship between a semi-transparent mirror unit and a display unit according to an embodiment of the inventive concept.

FIG. 6 is an exemplary view for explaining the arrangement relationship between a semi-transparent mirror unit 130 and a display unit 120 according to an embodiment of the inventive concept.

The display unit 120 is disposed within a predetermined distance range with respect to the semi-transparent mirror unit 130. More specifically, referring to FIG. 6, the display unit 120 may be disposed within a distance range R formed by the critical distance D before and after the distance $D_1$ between the user and the semi-transparent mirror unit 130 from the semi-transparent mirror unit 130. In other words, the separation distance $D_2$ between the semi-transparent mirror unit 130 and the display unit 120 may be $D_1-D' \leq D_2 \leq D_1+D'$.

The distance range R is a range in which a user may clearly perceive an image displayed on the semi-transparent mirror unit 130 and an image displayed on the display unit 120 without any focal change, When the display unit 120 is disposed outside the distance range R, the user may not clearly grasp the image displayed on the semi-transparent mirror unit 130 and the image displayed on the display unit 120 at once.

For example, as the separation distance between the semi-transparent mirror unit 130 and the display unit 120 is shorter than $D_1-D'$, when the display unit 120 is disposed closer to the semi-transparent mirror unit 130 than the distance range R (e.g., when the semi-transparent mirror unit 130 and the display unit 120 are attached to each other), the difference between the focal distance necessary for the user to look at the reflection image reflected on the semi-transparent mirror unit 130 and the focal distance necessary for viewing the image displayed on the display unit 120 is out of the allowable range. The user has the inconvenience of alternately checking the reflection image and the focus of the image. This is the same case where the display unit 120 is disposed farther away from the semi-transparent mirror unit 130 than the distance range R because the separation distance between the semi-transparent mirror unit 130 and the display unit 120 is longer than $D_1+D'$.

Ideally, when the semi-transparent mirror unit 130 and the display unit 120 are spaced apart from each other by the distance $D_1$ between the user and the semi-transparent mirror unit 130 (i.e., $D_2=D_1$), the focal distance for viewing the reflection image reflected on the semi-transparent mirror unit 130 and the focal distance for viewing the image displayed on the display unit 120 are identical, so that the user may perceive both the reflection image and the image clearly with the same focus.

However, according to an embodiment of the inventive concept, the display unit 120 may be spaced apart by a distance equal to or longer than the first distance (i.e., $D_1-D'$) which is shorter than the distance $D_1$ between the user and the semi-transparent mirror unit 130 by the predetermined critical distance D'. The display unit 120 may also be spaced apart by a distance equal to or shorter than the second distance (i.e., $D_1+D'$) which is longer than the distance $D_1$ between the user and the semi-transparent mirror unit 130 by the predetermined critical distance D'. Accordingly, the display unit 120 may be disposed within the distance range R (i.e., $D_1-D' \leq D_2 \leq D_1+D'$). Even in this case, the user may perceive the reflection image and the image together clearly without changing the focus.

According to this embodiment, the critical distance D' may be predetermined based on the pupil size of the user.

Specifically, the critical distance D' increases as the pupil size of the user decreases, and decreases as the pupil size increases. Generally, assuming that the pupil size of a person changes in the range of 2 mm to 8 mm and the pupil size of the user using the augmented reality providing device 10 is 2 mm, the first distance $D_N$ and the second distance $D_F$ reflecting the critical distance D' may be calculated by the following equation.

$$D_N = \frac{2z}{2+zT}, D_F = \frac{2z}{2-zT} \qquad \text{[Equation 1]}$$

Here, z is a value obtained by multiplying a metric distance between the user and the semi-transparent mirror unit 130 by 2 (i.e., $z=2D_1$), and T may be set to 0.126 to 0.86 as a tolerance set based on a diopter.

According to an inventive concept embodiment, the distance $D_1$ between the user and the semi-transparent mirror unit 130 may also be predetermined in the design phase of the augmented reality providing device 10. For example, when the augmented reality providing device 10 is manufactured in the size of a hand mirror and provides an augmented reality for the face appearance of the user, the distance $D_1$ between the user and the semi-transparent mirror unit 130 will be in the range of tens of cm. When the augmented reality providing device 10 is manufactured in a full-size mirror size and provides an augmented reality for a user's full body image, the distance $D_1$ between the user and the semi-transparent mirror unit 130 may be determined in the range of several meters.

In the above-described embodiment, although it is described that the semi-transparent mirror unit 130 and the display unit 120 are spaced apart by a distance equal to or longer than the first distance (i.e., $D_1-D'$) which is shorter than the distance $D_1$ between the user and the semi-transparent mirror unit 130 by the predetermined critical distance D', and equal to or shorter than the second distance (i.e., $D_1+D'$) which is longer than the distance $D_1$ between the user and the semi-transparent mirror unit 130 by the predetermined critical distance D', the separation distance between the semi-transparent mirror unit 130 and the display unit 120 may equal to or longer than the first distance (i.e., $D_1-D'$) and equal to or shorter than the distance $D_1$ between the user and the semi-transparent mirror unit 130, thereby reducing the size (i.e., device thickness) of the augmented reality providing device 10.

Also, the sizes of the semi-transparent mirror unit 130 and the display unit 120 may be reduced to half the size of an object (for example, a face of a user) for providing an augmented reality by synthesizing a virtual image. In this case, the augmented reality providing device 10 may be further downsized.

Referring again to FIG. 1, the control unit 140 may determine a position at which the image is displayed on the display unit 120 based on the body part of the user sensed by the sensing unit 110.

Figure 7:
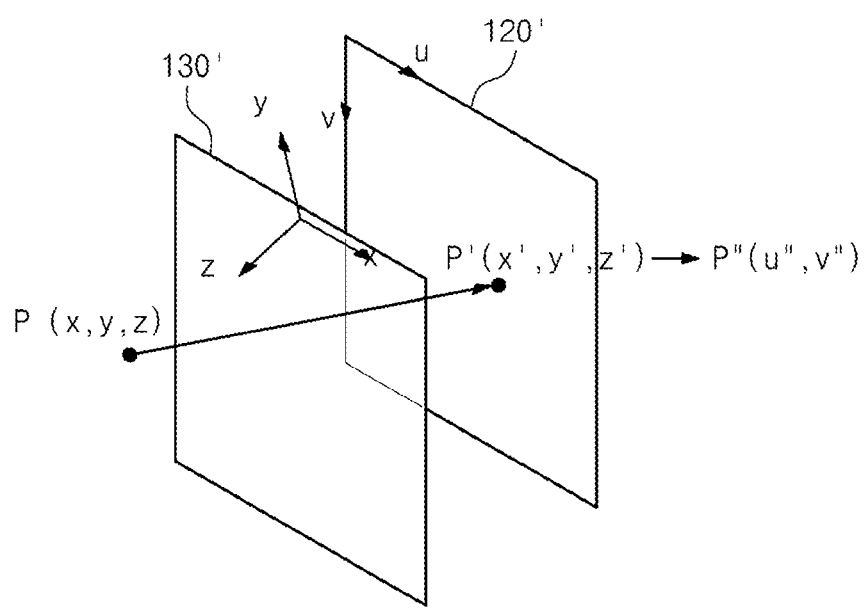
FIG. 7 is an exemplary view for explaining a process of determining a position at which an image is displayed on a display unit based on a sensed body part according to an embodiment of the inventive concept.

FIG. 7 is an exemplary view for explaining a process of determining a position at which an image is displayed on the display unit 120 based on a sensed body part according to an embodiment of the inventive concept.

As described above, when the sensing unit 110 captures a user and generates an image, the control unit 140 may sense a face object corresponding to a user's face and an eye object corresponding to an eye from the image through image processing to determine a position at which the image is displayed.

Then, the control unit 140 may calculate the viewpoint coordinate P(x, y, z) indicating the viewpoint of the user in the predetermined spatial coordinate system (the x, y, and z-axis orthogonal coordinate system) based on the eye object, and may calculate a gaze vector indicating the direction of the user's gaze in the space coordinate system based on the face object. That is, according to this embodiment, the position of the view point of the user may be determined by sensing the eye object in the image taken by the user, and the gaze direction of the user may be determined by sensing the face object in the captured image of the user. Here, the view point may correspond to a midpoint between two eyes of the user.

More specifically, the control unit 140 may acquire the direction that the user faces and determine the face direction to the gaze direction of the user based on the face object sensed from the image.

After that, in the spatial coordinate system, the control unit 140 may calculate the intersection point coordinate P'(x', y', z') where a straight line 1 extending in a direction parallel to the gaze vector while passing through the view point coordinate P (x, y, z) and a plane 120' corresponding to the display unit intersects.

And then, the control unit 140 transforms the intersection point coordinate P'(x', y', z') of the spatial coordinate system to the plane coordinate P"(u", v") of the plane coordinate system (the orthogonal coordinate system of the u and v axes in FIG. 7) set on the plane 120'.

In FIG. 7, the spatial coordinate system is set as an orthogonal coordinate system having the lens axis as a z-axis with the position of the sensing unit 110 corresponding to the camera as an origin, but the origin position and the axial direction of the spatial coordinate system are not limited thereto.

The control unit 140 may control the display unit 120 to display an image at a position corresponding to the plane coordinate P"(u", v") on the screen of the display unit 120.

To perform the above-described operation, the control unit 140 may include a processor such as a CPU and a GPU, and fetch a program prepared in advance for image processing and coordinate transformation from the storage unit 150 and execute it.

According to an embodiment of the inventive concept, the display unit 120 may display a virtual image for styling of a user. In this case, the virtual image may include an image of a wearable accessory.

FIGS. 8 to 11 are exemplary views showing images of accessories provided for styling of a user and their display positions according to embodiments of the inventive concept.

As shown in FIGS. 8 to 11, when an image $I_2$ corresponding to an accessory is displayed on the display unit 120, the user may see a composite view of the reflection image $I_1$ corresponding to the body part (for example, a face) reflected by the semi-transparent mirror unit 130 and the image $I_2$ corresponding to the accessory.

As shown in FIGS. 8 to 11, the image $I_2$ displayed on the display unit 120 may include images of various accessories such as a hat, a pair of glasses, a contact lens wearable by a user but the type of the accessory is not limited thereto.

According to one embodiment of the inventive concept, the control unit 140 may control the display unit 120 to display the image $I_2$ of the accessory at a point (e.g., $P_1$" to $P_6$" of FIGS. 8 to 11) spaced apart by a predetermined distance and distance with respect to the accessory from the plane coordinate P"(u", v") obtained through the embodiment of FIG. 7 in the plane coordinate system (e.g., the orthogonal coordinate system of the u and v axes). The direction and distance between the plane coordinate P"(u", v") and the points $P_1$" to $P_6$" may be set individually according to the type of accessory.

Figure 8:
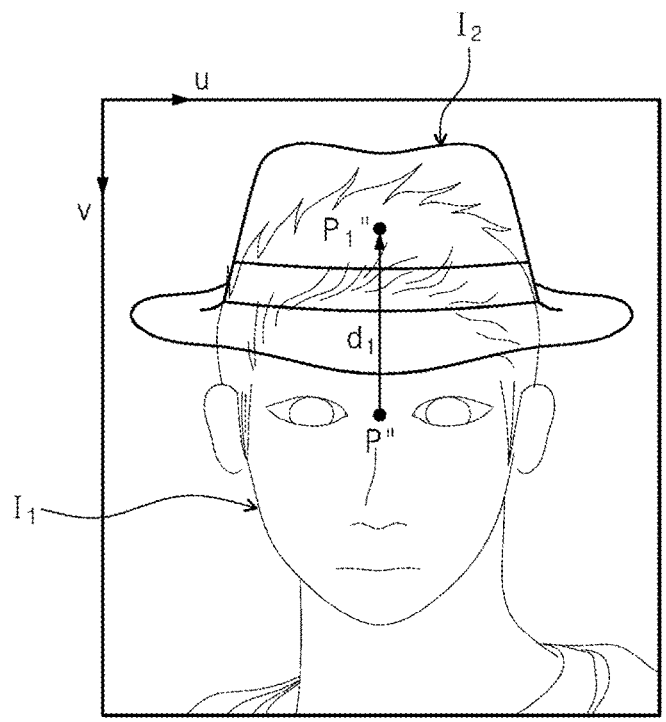
FIGS. 8 to 11 are exemplary views showing images of accessories provided for styling of a user and their display positions according to embodiments of the inventive concept.

For example, referring to FIG. 8, when the image $I_2$ displayed on the display unit 120 is a hat image, the control unit 140 may control the display unit 120 to display the hat image at the point $P_1$" that is shifted by $d_1$ in the direction in which the v-axis value decreases from the plane coordinate P"(u", v") in order to correspond the wearing position of the hat on the face of a person.

Figure 9:
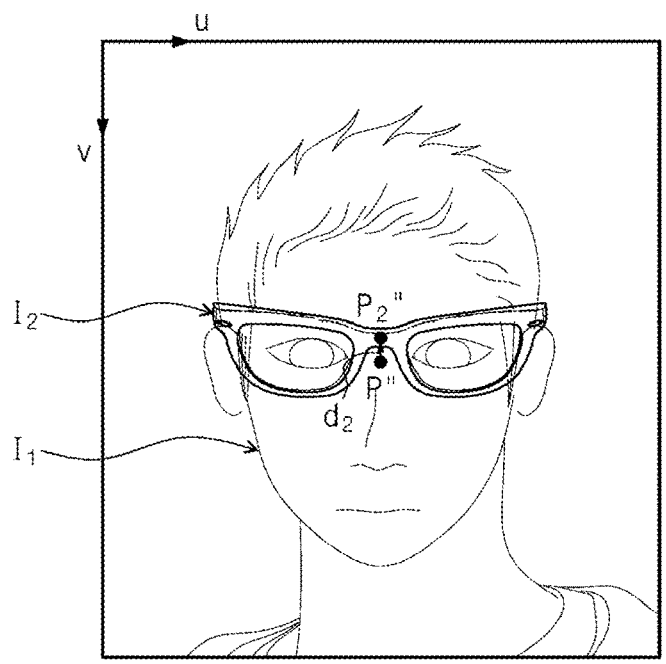

In the same manner, referring to FIG. 9, when the image $I_2$ displayed on the display unit 120 is an eyeglass image, the control unit 140 may control the display unit 120 to display the eyeglass image at the point P2" that is shifted by $d_2$ in the direction in which the v-axis value decreases from the plane coordinate P"(u", v") in order to correspond the wearing position of the eyeglass on the face of a person.

Figure 10:
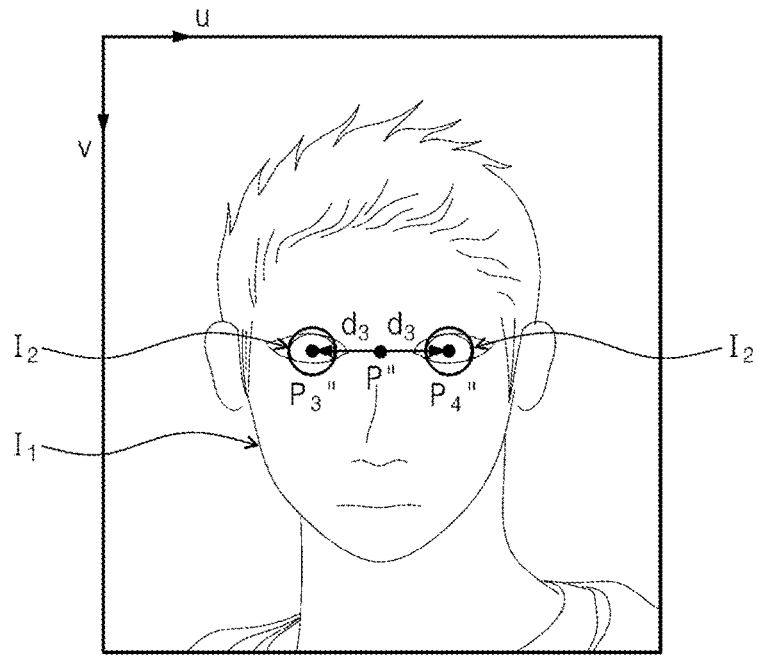

Referring to FIG. 10, when the image $I_2$ displayed on the display unit 120 is a contact lens image, the control unit 140 may control the display unit 120 to display each contact lens image at the points P3" and P4" that are shifted by $d_3$ in the direction in which the u-axis value decreases from the plane coordinate P"(u", v") in order to correspond the wearing position of the contact lens on the face of a person.

Figure 11:
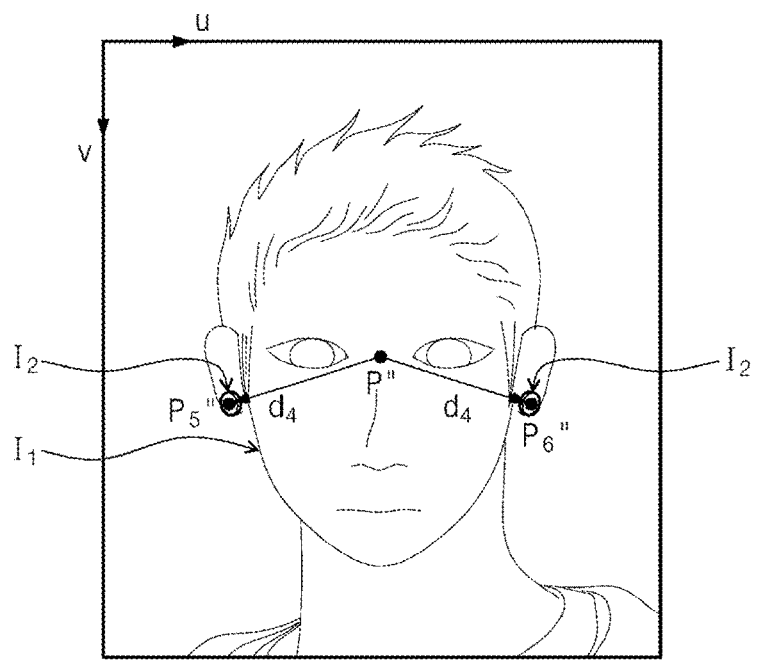

Referring to FIG. 11, when the image $I_2$ displayed on the display unit 120 is an earring image, the control unit 140 may control the display unit 120 to display each earring image at the points P5" and P6" that are shifted by d4 in the arrow direction of FIG. 11 from the plane coordinate P"(u", v") in order to correspond the wearing position of the earrings on the face of a person.

According to another embodiment of the inventive concept, the augmented reality providing device 10 may provide an augmented reality such as makeup by synthesizing an image of a makeup on a user's body part in addition to the augmented reality in which the image of the accessory is synthesized and provided to the user's body part.

Figure 12:
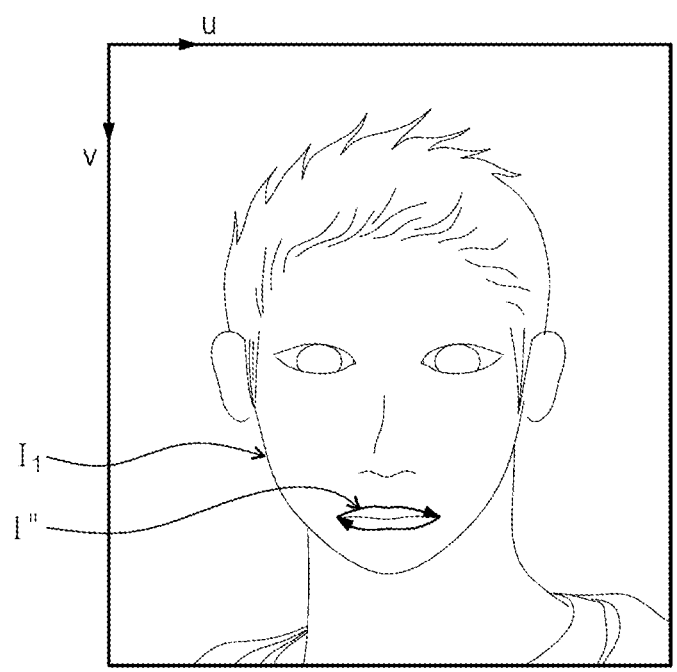
FIG. 12 is an exemplary view for explaining an interaction for user's makeup between a user and an augmented reality providing device according to another embodiment of the inventive concept.

FIG. 12 is an exemplary view showing the interaction provided for a user's makeup between a user and an augmented reality providing device 10 according to an embodiment of an inventive concept.

According to this embodiment, the control unit 140 senses a predetermined marking object from the image captured by the sensing unit 110, tracks the movement path of the marking object to control the display unit such that an image of a predetermined color tone is displayed on the display unit 120 in correspondence to the movement path.

For example, referring to FIG. 12, when a user looks at the augmented reality providing device 10 and draws a lip line along the lip with a finger or a stick marked at the end, the control unit 140 may sense a predetermined marking object from the captured image of the user. In this case, the marking object may be an object corresponding to a user's finger or an object corresponding to a marker and may be set in advance.

Then, the control unit 140 may track the movement path of the marking object in the image to obtain the display path l'' on the display unit 120 in correspondence to the movement path, and control the display unit 120 to display an image of a predetermined color tone on the display unit 120 along the display path l''.

A user may select a color tone of an image displayed on the display unit 120 through a user interface provided by the augmented reality providing device 10, and may also select an image type (line thickness, etc.).

Through this interaction, the user may try a virtual makeup on a body part such as a face using the augmented reality providing device 10.

Figure 13:
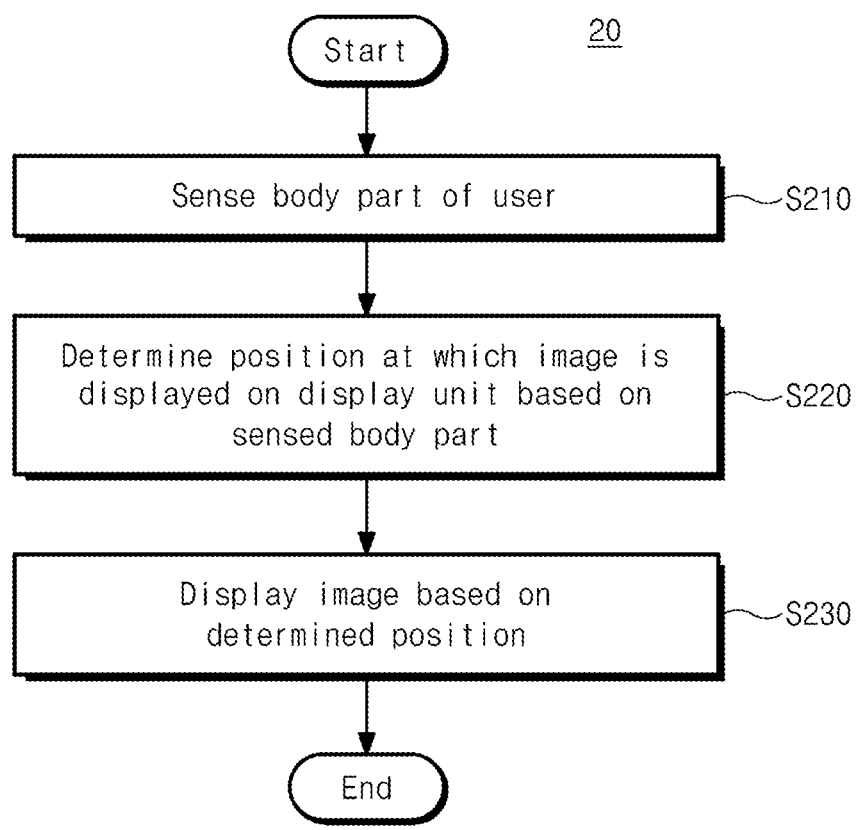
FIG. 13 is an exemplary flowchart of an augmented reality providing method according to an embodiment of the inventive concept.

FIG. 13 is an exemplary flowchart of an augmented reality providing method 20 according to an embodiment of the inventive concept.

The augmented reality providing method 20 may be executed by the augmented reality providing device 10 according to the embodiment of the inventive concept described above.

Referring to FIG. 13, the augmented reality providing method 20 includes operation S210 of sensing a body part of a user, operation S220 of determining a position at which an image is displayed on the display unit 120 based on the sensed body part, and operation S230 of displaying an image based on the determined position.

According to an embodiment, operation S210 of sensing the body part of the user may include an operation of photographing a user and generating an image.

Figure 14:
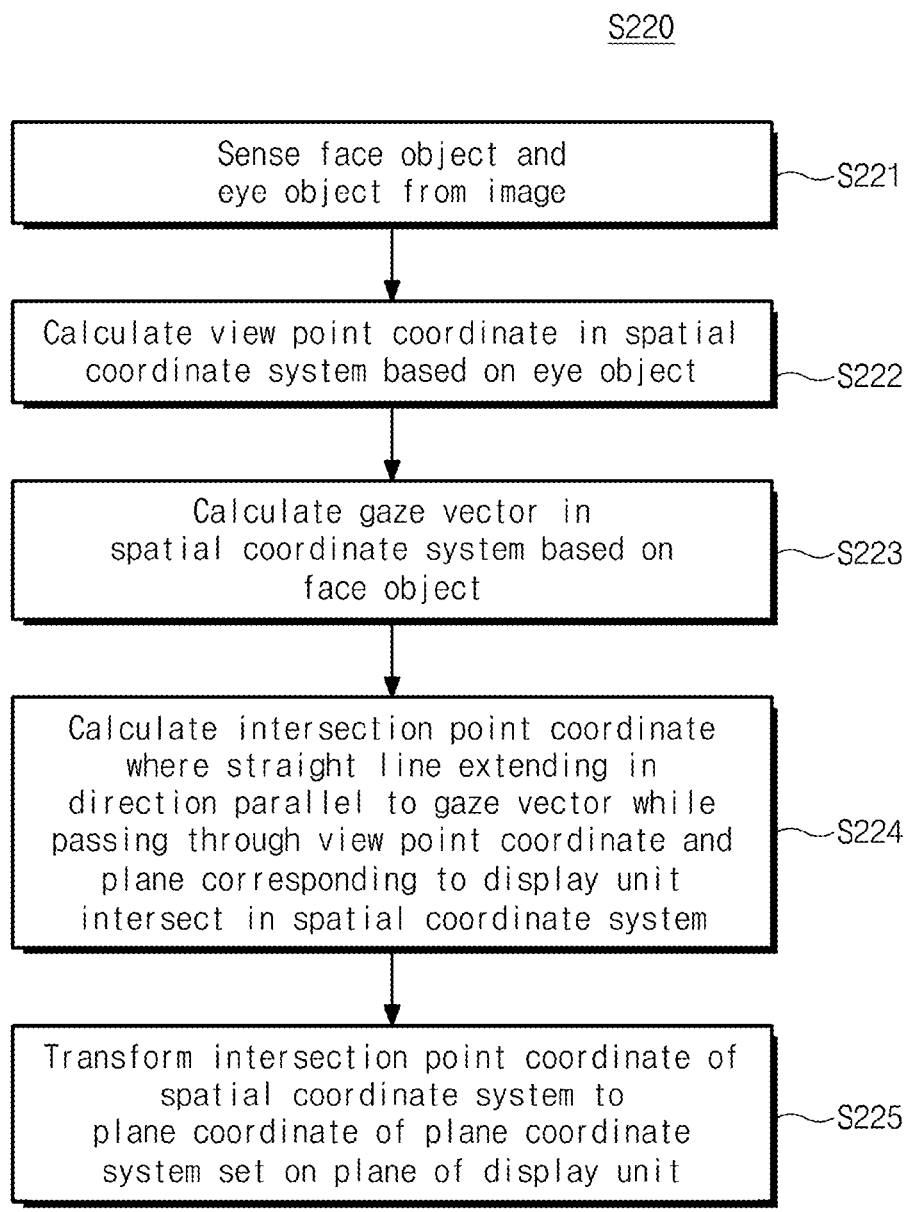
FIG. 14 is an exemplary flowchart for explaining a process of determining a position at which an image is displayed on a display unit based on a sensed body part according to an embodiment of the inventive concept.

FIG. 14 is an exemplary flowchart for explaining operation S220 of determining a position at which an image is displayed on the display unit 120 based on a sensed body part according to an embodiment of the inventive concept.

Referring to FIG. 14, operation S220 of determining the position at which the image is displayed on the display unit 120 based on the sensed body part may include operation S221 of sensing a face object corresponding to the user's face and an eye object corresponding to the eye from the image captured by the sensing unit 110, operation S222 of calculating a view point coordinate P(x, y, z) in a predetermined spatial coordinate system (x, y, z coordinate system) based on the eye object, operation S223 of calculating a gaze vector in the spatial coordinate system based on the face object, operation S224 of calculating an intersection point coordinate P'(x', y', z') where a straight line 1 extending in a direction parallel to the gaze vector while passing through the view point coordinate P(x, y, z) and a plane 120' corresponding to the display unit 120 intersect in the spatial coordinate system, and operation S225 of transforming the intersection point coordinate P'(x', y', z') of the spatial coordinate system to a plane coordinate P'''(u'', v'') of the plane coordinate system (u, v coordinate system) set on the plane 120' of the display unit.

According to one embodiment of the inventive concept, operation S230 of displaying the image based on the determined position may include an operation of displaying a virtual image for styling of a user.

The virtual image may include images of wearable accessories such as a hat, glasses, contact lenses, earrings, and the like.

According to one embodiment of the inventive concept, operation S230 of displaying the image based on the determined position may include an operation of displaying an image of the accessory at a position apart a predetermined distance in a predetermined direction from the plane coordinate P''' (u'', v'') in the plane coordinate system. The predetermined distance and the predetermined direction may be predetermined with respect to the accessory.

According to another embodiment of the inventive concept, operation S220 of determining the position at which the image is displayed on the display unit 120 based on the sensed body part may further include an operation of sensing a predetermined marking object from the image, and an operation of tracking the movement path of the marking object. Then, the operation of displaying the virtual image for styling of the user may include an operation of displaying an image of a predetermined color tone in correspondence to the movement path.

The augmented reality providing method 20 may be stored on a computer-readable recording medium that is manufactured as a program for execution on a computer. The computer-readable recording medium includes all kinds of storage devices in which data readable by a computer system is stored. Examples of the computer-readable recording medium include ROM, RAM, CD-ROM, magnetic tape, floppy disk, optical data storage, and the like. In addition, the augmented reality providing method 20 may be implemented as a computer program stored on a medium for execution in association with the computer.

According to an embodiment of the inventive concept, when using a mirrored augmented reality system, a user may see both the actual image of the mirror in the mirror and the virtual image displayed on the display. Thus, the user convenience of the augmented reality system may be increased.

According to an embodiment of the inventive concept, the augmented reality system may be utilized more advantageously because a user may freely try various styles through the augmented reality.

Although the inventive concept has been described in the above embodiments, the above embodiments are merely illustrative of the ideas of the inventive concept. Those skilled in the art will understand that various modifications may be made to the embodiments described above. The scope of the inventive concept is determined solely by the interpretation of the appended claims.

The invention claimed is:

1. An augmented reality providing device comprising:
   a camera configured to capture a body part of a user and generate an image;
   a display panel configured to display an image of an accessory wearable by the user for styling of the user;
   a semi-transparent mirror disposed spaced from the display panel and configured to reflect light incident from the user to emit the reflected light to the user, and transmit light incident from the display panel to provide the transmitted light to the user; and
   a processor configured to determine a position at which the image is displayed on the display panel based on the sensed body part,
   wherein the processor is configured to:
      sense a face object corresponding to the user's face and an eye object corresponding to the user's eye from the image,
      calculate a view point coordinate in a predetermined spatial coordinate system based on the eye object,
      calculate a gaze vector in the spatial coordinate system based on the face object,
      calculate an intersection point coordinate in the spatial coordinate system, the intersection point being where a straight line extending in a direction parallel to the gaze vector while passing through the view point coordinate and a plane corresponding to the display panel intersect in the spatial coordinate system, transform the intersection point coordinate in the spatial coordinate system to a plane coordinate in a plane coordinate system set on the plane corresponding to the display panel, and control the display panel to display the image of the accessory at a position apart from a predetermined distance in a predetermined direction from the plane coordinate in the plane coordinate system, the predetermined distance and the predetermined direction being predetermined to the accessory.

2. The augmented reality providing device of claim 1, wherein the semi-transparent mirror and the display panel are spaced apart by a distance equal to or longer than a first distance and equal to or shorter than a second distance, the first distance being shorter than a distance between the user and the semi-transparent mirror by a predetermined critical distance, the second distance being longer than the distance between the user and the semi-transparent mirror by the critical distance.

3. The augmented reality providing device of claim 2, wherein the critical distance is determined in advance based on a pupil size of the user.

4. The augmented reality providing device of claim 3, wherein the critical distance increases as the pupil size of the user decreases and decreases as the pupil size increases.

5. The augmented reality providing device of claim 2, wherein the semi-transparent mirror and the display panel are spaced apart by a distance equal to or longer than the first distance and equal to or shorter than the distance between the user and the semi-transparent mirror.

6. The augmented reality providing device of claim 1, wherein the semi-transparent mirror comprises a light-transmissive substrate having a wire grid formed on at least one side.

7. The augmented reality providing device of claim 1, wherein the processor is configured to sense a predetermined marking object from the image, track a movement path of the marking object, and control the display panel to display an image of a predetermined color tone on the display panel in correspondence to the movement path.

8. A method of providing augmented reality to a user by an augmented reality providing device in which a semi-transparent mirror and a display panel are spaced apart, the method comprising:

sensing the user's body part;

determining a position at which an image is displayed on the display panel based on the sensed body part; and displaying the image based on the determined position, wherein the sensing of the user's body part comprises generating an image by capturing the user, wherein the displaying of the image based on the determined position comprises displaying a virtual image for styling of the user, the virtual image comprising an image of an accessory wearable by the user, wherein the determining of the position at which the image is displayed on the display panel based on the sensed body part comprises:

sensing a face object corresponding to the user's face and an eye object corresponding to the user's eye from the image, calculating a view point coordinate in a predetermined spatial coordinate system based on the eye object, calculating a gaze vector in the spatial coordinate system based on the face object, calculating an intersection point coordinate in the spatial coordinate system, the intersection point being where a straight line extending in a direction parallel to the gaze vector while passing through the view point coordinate and a plane corresponding to the display panel intersect in the spatial coordinate system, transform the intersection point coordinate in the spatial coordinate system to a plane coordinate in a plane coordinate system set on the plane corresponding to the display panel, and wherein the displaying of the image based on the determined position comprises displaying an image of the accessory at a position apart from a predetermined distance in a predetermined direction from the plane coordinate in the plane coordinate system, the predetermined distance and the predetermined direction being predetermined to the accessory.

9. The method of claim 8, wherein the determining of the position at which the image is displayed on the display panel based on the sensed body part further comprises:

sensing a predetermined marking object from the image; and tracking a movement path of the marking object, wherein the displaying of the virtual image for the styling of the user comprises displaying an image of a predetermined color tone on the display panel in correspondence to the movement path.

10. A non-transitory computer-readable recording medium storing a program for executing the augmented reality providing method according to claim 8 by a computer.

* * * * *